US008478815B2

(12) United States Patent
Ewe

(10) Patent No.: US 8,478,815 B2
(45) Date of Patent: Jul. 2, 2013

(54) SYSTEM AND METHOD FOR IMPROVED SAP COMMUNICATIONS

(75) Inventor: Thomas Ewe, San Francisco, CA (US)

(73) Assignee: Synactive, Inc., Foster City, CA (US)

(*) Notice: Subject to any disclaimer, the term of this patent is extended or adjusted under 35 U.S.C. 154(b) by 0 days.

(21) Appl. No.: 13/425,101

(22) Filed: Mar. 20, 2012

(65) Prior Publication Data
US 2012/0191775 A1   Jul. 26, 2012

Related U.S. Application Data

(63) Continuation of application No. 12/623,156, filed on Nov. 20, 2009, now Pat. No. 8,140,617.

(60) Provisional application No. 61/116,573, filed on Nov. 20, 2008.

(51) Int. Cl.
G06F 15/16 (2006.01)
G06F 15/173 (2006.01)

(52) U.S. Cl.
USPC ............ 709/203; 709/219; 709/223; 709/224

(58) Field of Classification Search
USPC .................. 704/270; 709/203, 205, 217, 219, 709/223, 224; 379/114.03; 455/566
See application file for complete search history.

(56) References Cited

U.S. PATENT DOCUMENTS

| 6,058,375 | A | 5/2000 | Park |
| 6,970,823 | B1* | 11/2005 | Yago et al. ................ 704/270 |
| 7,386,485 | B1 | 6/2008 | Mussman et al. |
| 7,577,601 | B1 | 8/2009 | Rademacher et al. |
| 7,752,299 | B2 | 7/2010 | Bookman et al. |
| 7,792,784 | B2 | 9/2010 | Gupta |
| 8,010,605 | B2* | 8/2011 | Chang ........................ 709/205 |
| 2003/0231750 | A1* | 12/2003 | Janveja et al. ........... 379/114.03 |
| 2006/0041618 | A1* | 2/2006 | Chang ........................ 709/205 |
| 2007/0234235 | A1* | 10/2007 | Scott .......................... 715/825 |
| 2007/0238488 | A1* | 10/2007 | Scott .......................... 455/566 |
| 2007/0238489 | A1* | 10/2007 | Scott .......................... 455/566 |

* cited by examiner

Primary Examiner — Quang N Nguyen
(74) Attorney, Agent, or Firm — Pattric J. Rawlins; Procopio, Cory, Hargreaves & Savitch LLP

(57) ABSTRACT

Improved SAP communications are provided by a terminator node that acts as termination on one end of the communication channel and links to the SAP server on the other end. A server device is also provided that optionally implements this terminator node and monitors communications between the SAP server and a client. The server device optionally condenses SAP application screens. The server device also simulates certain required responses to the SAP server to allow for a persistent session between a client and the SAP server when the actual connection may be intermittent. The server device also records required records for a transaction and provides them to a client for offline processing and then synchronizes stored offline transaction data from the client with the SAP server. The system may include a client device that optionally implements the terminator node to communicate with the server device or the SAP server.

62 Claims, 4 Drawing Sheets

SYSTEM AND METHOD FOR IMPROVED SAP COMMUNICATIONS

RELATED APPLICATION

This application is a continuation of U.S. patent application Ser. No. 12/623,156, filed Nov. 20, 2009 and entitled "System and Method for Improved SAP Communications," and scheduled to issue as U.S. Pat. No. 8,140,617 on Mar. 20, 2012, which in turn claims priority to U.S. Provisional Patent Application No. 61/116,573, filed 20 Nov. 2008, which is incorporated herein in its entirety by reference.

BACKGROUND

1. Field of the Invention

The present invention is generally related to client-server communications and is more specifically related to simplifying user interaction with a SAP server and extending SAP functionality to mobile and intermittently connected devices.

2. Related Art

Conventional SAP software products focus on enterprise resource planning ("ERP"). These products are delivered by way of an SAP environment which employs a SAP R3 server as the primary server to deliver these software products. SAP provides five major enterprise applications including ERP, customer relationship management ("CRM"), product lifecycle management ("PLM"), supply chain management ("SCM"), and supplier relationship management ("SRM").

As illustrated in FIG. 1, a conventional SAP system 10 includes a SAP R3 server 20 that has a data storage area 25. The R3 server 20 is connected to a plurality (only one is shown) of SAP GUI clients 60 that allow users to interact with the various applications provided by the application server module 30 and data managed by the data base module 40 on the SAP R3 server 20. The R3 nomenclature is generally understood to reflect the 3 tier architecture of a SAP system that includes the database 40, the application server 30, and the client 60 (SAP GUI client). In the SAP system, the SAP GUI client 60 is connected to the R3 server 20 via a wired or wireless network 50 that allows the R3 server and client to maintain a persistent connection across the network 50.

Often, customers that use the SAP R3 system 10 desire to make changes to certain user interfaces. Making such changes is cumbersome at least and can often require expensive custom programming in the Java language or the Advanced Business Application Programming ("ABAP") language.

Additionally, users of the SAP R3 server 20 are unable to interact with the various applications and/or data to accomplish their work unless they are sitting in front of a computer running the Microsoft® Windows® operating system and also running the SAP GUI client 60. One significant drawback of the SAP R3 system 10 is that the SAP GUI client 60 only runs on the Windows operating system, which therefore precludes use of the SAP system 10 for a very significant number of potential user input devices.

Some attempts at providing the ability for a mobile device to communicate with the SAP system 10 have been undertaken. These solutions have problems such as being limited to only those devices that support web based applications. Web based applications also face challenges due to the cumbersome and difficult to use interface. Other attempts at a mobile solution include custom applications that communicate with the SAP server 20 using the limited SAP business application programming interface ("BAPI") that are implemented using remote function calls ("RFCs").

Furthermore, these limitations of the SAP R3 system 10 require that employees in the field conduct business transactions manually. For example, a sales person brings paperwork containing information regarding the potential customer, price lists, discount schedules, etc. to a sales call. The sales person must manually create a quote to deliver to the potential customer during the sales call or make verbal commitments to the customer. After providing the potential customer with a manually created quote or a verbal commitment, the sales person continues with sales calls throughout the day. When the sales person returns to the office, the manually created quote and/or verbal commitment information is entered into the SAP R3 server 20 ERP system, which then can generate the official quotes that can be delivered to the customer. A similar process must be followed for orders from the customer, e.g., received orders must be subsequently entered into the SAP R3 server 20 to make them official.

Therefore, what is needed is a system and method that provides improved communications with a SAP system to overcome the significant limitations and problems found in the conventional SAP systems described above.

SUMMARY

Accordingly, described herein are systems and methods for improved SAP communications that allow user devices to serve as the (client device) and communicate with a SAP server via a wired or wireless network and using a persistent or intermittent connection. A GUIXT server runs on the SAP R3 server or on its own server hardware and interfaces with a GUIXT client on the client device that provides the user with an improved user interface for SAP applications. The GUIXT server and client combination allows for improved communications in a SAP environment where the GUIXT client may run on a mobile device and be in communication with the SAP R3 server via a wireless communication network. The client may also run on a remote device and process transactions offline while only periodically connecting to the SAP R3 server.

In one embodiment, the GUIXT server provides an intermediary application that talks to the SAP R3 server over the wired network (or via the SAP R3 server itself) and mimics the SAP R3 functionality to client devices running the GUIXT client application. The GUIXT server also enables the deployment of simplified user interfaces for the various SAP applications in a centralized fashion and extends the SAP functionality to mobile and periodically connected (offline) devices.

To enable communications between a mobile device and the SAP R3 server, the GUIXT server operates as the termination node and responds to network communications from the SAP server (e.g., remote function call traffic) and completes these specific types of transactions so that the SAP server will continue to maintain the connection with the client and will continue to send traffic data. The responses to these network communications from the SAP server advantageously complete the transaction without actually performing any of the necessary operations requested by the SAP Server. Accordingly, the SAP functionality can be extended to a wide variety of additional user input devices such as 10 key devices, barcode readers, laser scan guns, personal digital assistants ("PDAs"), data collection terminals and any other type of mobile device from which it is desirable to input data to or receive data from the SAP R3 server.

Additionally, the system allows for use of applications that run on the client device and are designed to capture and save business transaction data (e.g., in the field) while the client device is communicatively disconnected from the backend SAP R3 server system (i.e., in an offline state). These client device applications can then synchronize the saved offline business transaction data with the SAP R3 server system when they are later communicatively connected to the SAP server.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide systems and methods for improved SAP communications. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
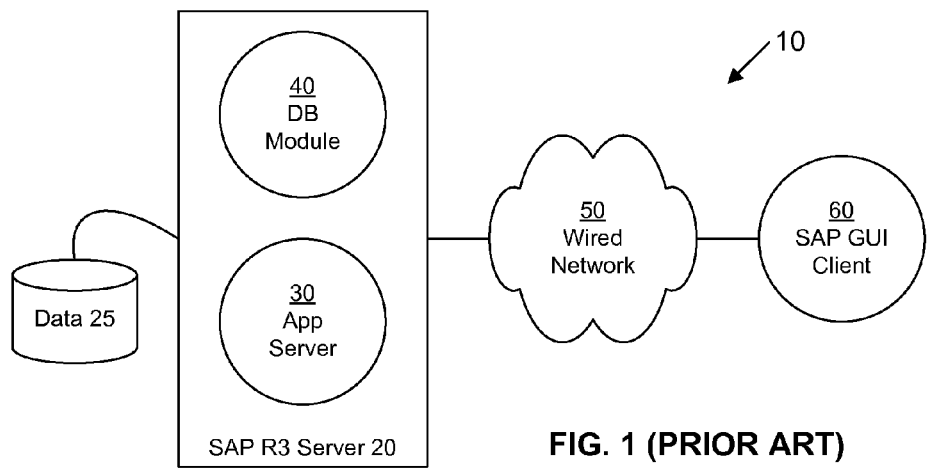
FIG. 1 is a network diagram illustrating a conventional SAP system.
Figure 2:
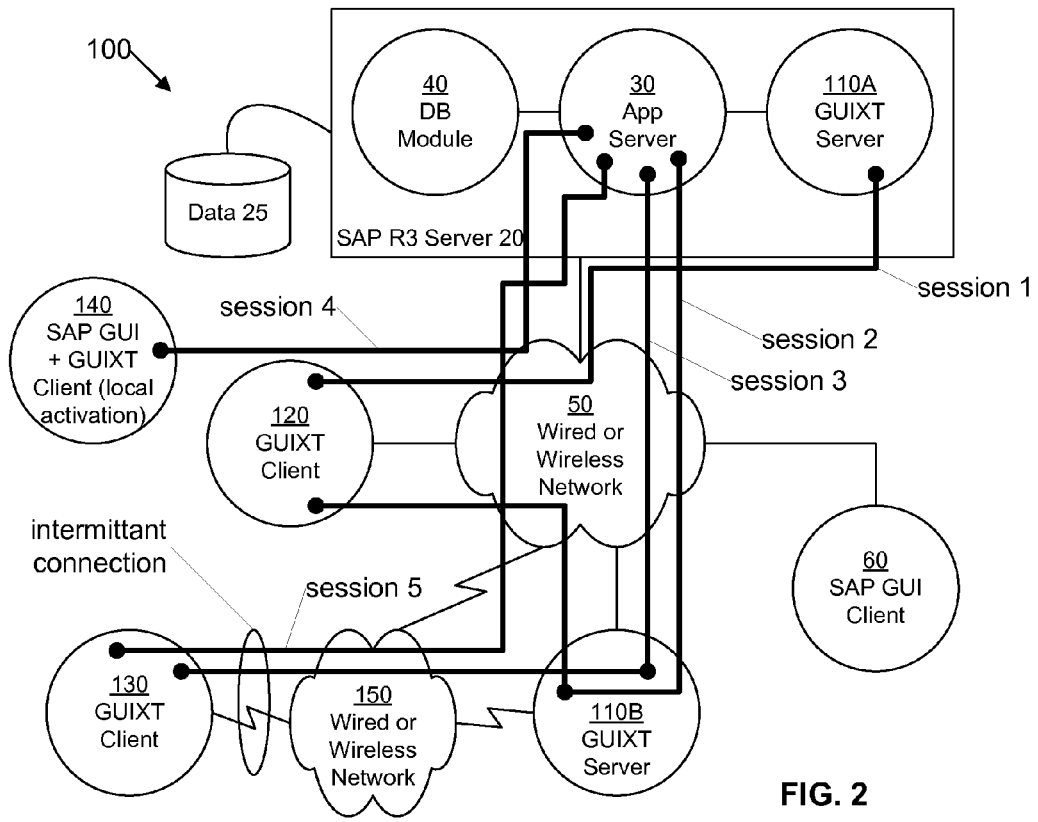
FIG. 2 is a network diagram illustrating an example system for improved communications in a SAP environment according to an embodiment of the present invention.

FIG. 2 is a network diagram illustrating an example system 100 for improved communications in a SAP environment according to an embodiment of the present invention. In the illustrated embodiment, the system 100 includes a conventional SAP R3 server 20 having an application server module 30, a database module 40 and also a GUIXT server module 110A that is resident on the server. The server 20 also includes a data storage area 25.

The illustrated system 100 also includes a GUIXT server device 110B that is communicatively coupled with the SAP R3 server via a wired or wireless network 50. One or more GUIXT clients 120, SAP GUI+GUIXT clients 140 and SAP GUI clients 60 may also be communicatively coupled with the SAP R3 server via a wired or wireless network 50. The network 50 may also be communicatively coupled with one or more additional networks that may be wired or wireless networks such as network 150. Additional GUIXT clients 130, SAP GUI+GUIXT clients 140 and SAP GUI clients 60 may be communicatively coupled with the SAP R3 server via a combination of networks including networks 150 and 50.

In alternative embodiments, the system 100 can be operated with one or both of the GUIXT server module 110A and the GUIXT server device 110. Advantageously, multiple GUIXT servers 110(A or B) can be employed at the same time to provide load balancing amongst the GUIXT servers 110(A or B). In such an embodiment, one of the multiple GUIXT servers is identified as a message server to which clients (e.g., SAP GUI client 60, SAP CONSOLE (not shown), and GUIXT clients 120, 130 and 140) will connect and the multiple GUIXT servers (110A and 110B) communicate amongst themselves to select the GUIXT server with the least load to process the next connection.

The GUIXT server module 110A or device 110B provides a communication channel between one or more GUIXT client devices and the application server 30 on the SAP R3 server 20. This communication channel can advantageously be configured on the GUIXT server module 110A or device 110B, for example, by establishing a target server variable that identifies a particular application server 30 to which the GUIXT server 110A or 110B will connect. Because there may be multiple redundant SAP R3 servers 20 to provide load balancing, the target server variable on the GUIXT server 110A or 110B may identify a SAP R3 messaging server (not shown) that is responsible for load balancing across the multiple SAP R3 servers. Also, the GUIXT server 110A or 110B can select the SAP R3 server with the least load to connect and communicate with. The GUIXT server 110A or 110B may communicate with the SAP R3 server using a variety of methods including remote function calls, intermediate documents ("IDOCS") and many other standard ways to communication with the SAP R3 server.

For example, the target server variable can be set to the name of the SAP R3 server 20 (e.g., Juneau); the name of the SAP R3 server 20 in combination with a logical port number (e.g., Juneau:3200 or Juneau.sap.com:3600); or the host-port combination using SAP notation (e.g., /H/Juneau/S/sapdp00). When setting the target server variable to a messaging server for load balancing, the target server variable can also the SAP notation (e.g., /M/Juneau.sap.com/S/sapmsPRD/G/SAP_Prod_Sys). In a messaging server embodiment, the /M/ notation identifies the messaging server, the /S/ identifies the service (logical port) to connect to, and the /G/ notation identifies the logon group to connect to. Advantageously, the /M/ and /G/ notations will employ a default value if not included in the value to which the target server variable is set.

In one embodiment, the GUIXT server 110A or 110B can also be configured as a SAP router in order to communicate directly with the SAP GUI client 60. For example, an initialization file can be edited to instruct the GUIXT server 110A or 110B to act as a SAP router by setting a TargetServer variable to "saprouter" and also setting a TargetServerPort variable to "saprouter." In such an embodiment, the SAP GUI client 60 identifies the internet protocol address of the GUIXT server 110A or 110B in its SAP router variable (e.g., 192.161.15.7)

In the illustrated embodiment, there are three GUIXT client devices (120, 130 and 140) that provide a user with an interface for interacting with the various applications that are provided by the application sever module 30 on the SAP R3 server 20. The first two devices are GUIXT client devices 120 and 130 and the third device is SAP GUI client device 140 that is running a locally activated version of the GUIXT client.

GUIXT client 120 is communicatively coupled with the SAP R3 server 20 and the GUIXT server 110 via the wired or wireless network 50. A first user session 1 with the SAP R3 server 20 from GUIXT client 120 may be established via the GUIXT server module 110A that is resident on the SAP R3 server 20. The GUIXT server module 110A, in turn, communicates with the Application server module 30 on the SAP R3 server 20. A second user session 2 with the SAP R3 server 20 from the GUIXT client 120 may separately be established via the GUIXT server device 110B that is communicatively coupled with the GUIXT client 120 and the SAP R3 server 20 via the wired or wireless network 50. The GUIXT server device 110B, in turn, communicates with the Application server module 30 on the SAP R3 server 20 to allow the GUIXT client 120 to interact with the various applications and data provided via the application server 30.

GUIXT client 130 is communicatively coupled with the SAP R3 server 20 via the wired or wireless network 50 and one or more (only one is shown) wired or wireless networks 150 in between. For example, the one or more wired or wireless networks 150 in between may include the Internet. A third user session 3 with the SAP R3 server 20 from the GUIXT client 130 may be established via the GUIXT server 110B that is communicatively coupled with the SAP R3 server 20 via the wired or wireless network 50. The GUIXT server 110B, in turn, communicates with the Application server module 30 on the SAP R3 server 20.

GUIXT client 140 is locally activated on a SAP GUI device and communicatively coupled with the SAP R3 server 20 via the wired network 20. A fourth user session 4 with the SAP R3 server 20 from GUIXT client 140 may be established directly with the Application server module 30 that is resident on the SAP R3 server 20 using the SAP GUI client that is also resident on client device 140.

In one embodiment, GUIXT client 130 includes and/or implements a termination node module, for high fidelity and complete communication with the SAP R3 server 20. Failure to implement the termination node module may result in low fidelity communications between GUIXT client 130 and the SAP R3 server 20 that would impede the proper functioning of GUIXT client 130, for example, due to the intermittent nature of wireless communications. The third user session 3 with the SAP R3 server 20 from GUIXT client 130 is established via the GUIXT server device 110B that is in communication with GUIXT client 130 via the one or more wired or wireless networks. Advantageously, the connection between GUIXT client 130 and the GUIXT server device 110B can be persistent or intermittent. GUIXT client 130 may also be actively processing transactions while disconnected from the GUIXT server device 110B (i.e., offline) and then later synchronize those transactions with the SAP R3 server 20 after coming online via a connection to the SAP R3 server 20 through the GUIXT server device 110B.

In an alternative embodiment, the GUIXT client 130 implements a termination node module and connects directly to the application server 30 via one or more networks, for example wired or wireless networks 150 and 50, which is illustrated as session 5. The termination node module advantageously allows the GUIXT client 130 to communicated directly with the application server 30 on the SAP R3 server without the need for the intermediate connection via the GUIXT server 110A or 110B.

The function of the GUIXT server (module 110A or device 110B) is to simulate the SAP R3 server 20 on one end of the connection and simulate SAP GUI on the other end of the connection to facilitate the completion of transactions between any client and the SAP R3 server 20. The GUIXT server (module 110A or device 110B) resides in the communication path of the SAP R3 multi-tier architecture and processes SAP client and server traffic to accomplish this function.

The GUIXT server (module 110A or device 110B) provides the ability to control communication between the SAP R3 server 20 and a client to support client devices that run any variety of operating systems and/or special control software (e.g., laser scanners and the like) and to also support client devices that are mobile, wireless, or intermittently connected (e.g., field devices that are offline during data collection for certain transactions). In one embodiment, the GUIXT server (module 110A or device 110B) may optionally provide scripting capability that allows a user to implement custom functionality, custom access controls, and to otherwise refine and simplify processes. The GUIXT server (module 110A or device 110B) preserves the connection to the SAP R3 server 20 when communicating with a mobile client device that may, e.g., be connected to the SAP environment via a wireless communication network or otherwise have an intermittent network connection. The GUIXT server (module 110A or device 110B) advantageously allows a mobile client device to seamlessly reconnect with the SAP R3 server 20 and continue with in progress transactions or start new transactions even when the network connectivity between the mobile device and the SAP R3 server 20 is intermittent.

Furthermore, the GUIXT server (module 110A or device 110B) provides downloadable transaction data and forms that can be used by a remote device in an offline setting to process transaction data. When the remote device comes online, the GUIXT server (module 110A or device 110B) receives the transaction data that was processed offline and converts that data and sends it to the SAP R3 server 20 as if the transaction was taking place in real time. In this way the GUIXT server (module 110A or device 110B) provides an offline transaction processing and synchronization functionality in a SAP environment that has never before existed.

Figure 3:
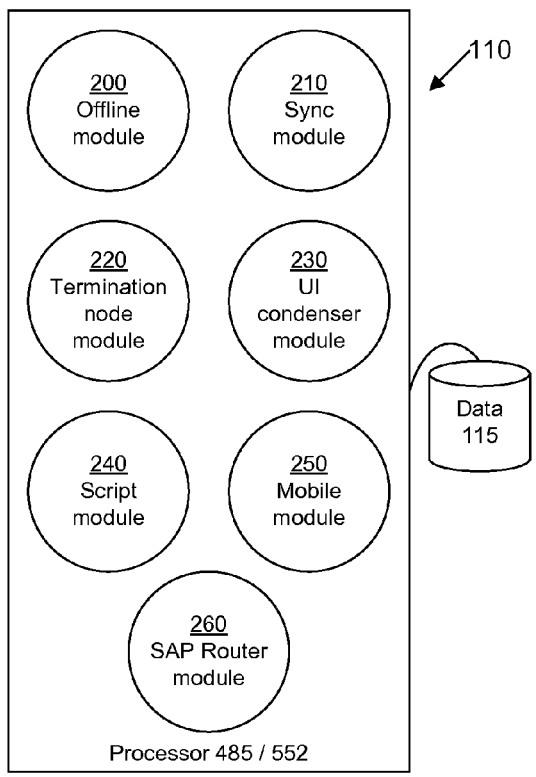
FIG. 3 is a block diagram illustrating an example GUIXT server according to an embodiment of the present invention.

FIG. 3 is a block diagram illustrating an example GUIXT server 110 according to an embodiment of the present invention. In the illustrated embodiment, the GUIXT server 110 can be a server module that is executed by a processor of a SAP R3 server device, such as the previously described GUIXT server 110A, or the GUIXT server 110 can be a server device with its own processor, such as the previously described GUIXT server 110B. Alternative processors 485 or 552 are later described with respect to FIGS. 9 and 10. The illustrated GUIXT server 110 includes an offline module 200, a synchronization (sync) module 210, a termination node module 220, a user interface condenser module 230, a script module 240, a mobile module 250 and a SAP router module 260. These modules are all capable of being executed by the processor 485/552. The GUIXT server 110 advantageously provides a centralized mechanism to interface with various clients, including GUIXT clients, SAP GUI clients and SAP CONSOLE clients (not shown).

The offline module 200 facilitates the creation and propagation of offline transaction forms and user interfaces that can be used by devices in an offline environment to process transaction data. The offline module 200 works in concert with the sync module 210 to update the SAP R3 server with the offline transaction data in a way that the SAP R3 server accepts and records the offline transaction as if the transaction were being processed in real time. A user may employ the scripting module 240 to provide additional access control, business rules and/or to create offline transaction forms that can be used.

The termination node module 220 monitors traffic between the SAP R3 server and a GUIXT client and timely responds to SAP R3 Remote Function Call ("RFC") communications that require a response in order to satisfy the SAP R3 communication protocol. The termination node module 220 responses preserve the session between the SAP R3 server and the client (e.g., a GUIXT client) whether or not the client is currently online and communicating with the GUIXT server 110, without affecting the fidelity of the underlying data in the transaction. Advantageously, preservation of the session by the termination node module 220 allows the GUIXT server 130 to access and obtain the full range of available data and transactions from the SAP R3 server, which would otherwise be limited or altogether unavailable. In one embodiment, the termination node module 220 is configured to detect a disconnect with the client and in response, put the connection with the SAP R3 server in a suspended state until the client reconnects.

In one embodiment, the termination node module 220 receives communications from the SAP R3 server and translates those communications into another form such as hypertext markup language ("HTML") or java script object notation ("JSON"). Other formats may also be used. Advantageously, the translated HTML or JSON communications are more easily processed and handled by a GUIXT client.

The mobile module 250 works in concert with the termination node module 220 to facilitate communications between a mobile device client and the SAP R3 server. Additionally, the mobile module 250 may work with the UI condenser module 230 to provide an alternative user interface to a user of the mobile device client that is tailored to maximizing productivity of the various SAP applications through the small screen size of the mobile device client. The UI condenser module 230 also provides condensed SAP application screens to a GUIXT client interface that can reduce the number of screens required to complete a single transaction. In one embodiment, significant efficiencies can be realized using the UI condenser module 230. For example, a transaction requiring twenty five (25) native screens can be condensed to four (4) screens. In one embodiment, the GUIXT server collects the data from the client using four screens and then provides it to the SAP R3 server using the twenty five screens expected by the SAP R3 server.

The script module 240 works in concert with many of the other modules to allow a user to customize many aspects of the GUIXT server functionality and to allow the user to streamline data collection screens or implement streamlined data collection screens developed by a third party. The SAP router module 260 is configured to operate as a SAP router to allow native SAP GUI clients to communicate with the SAP R3 server via the GUIXT server.

The GUIXT server 110 also has access to a data storage area 115 for persistent and volatile storage of transaction data, scripts, programs, and other useful data. Data storage area 115 can be implemented as data 490, memory 556 or secondary memory 558 as later described with respect to FIGS. 9 and 10. The GUIXT server 110 is also configured to implement load balancing by connecting to the least busy SAP server.

Figure 4:
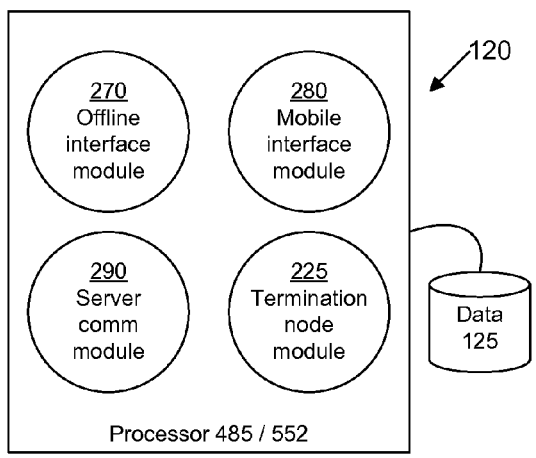
FIG. 4 is a block diagram illustrating an example GUIXT client according to an embodiment of the present invention.

FIG. 4 is a block diagram illustrating an example GUIXT client 120 according to an embodiment of the present invention. In the illustrated embodiment, the GUIXT client 120 includes a processor, such as processors 485 or 552 that are later described with respect to FIGS. 9 and 10. In the illustrated embodiment, the GUIXT client 120 also comprises modules that can be executed by the processor 485 or 552 including an offline interface module 270, a mobile interface module 280, a server communication module 290 and a termination node module 225. The GUIXT client 120 may be implemented on a variety of machines. One particular machine is a personal computer device. Another particular machine is a personal data assistant ("PDA") device. Other particular machines include a smart phone device, laser scanner gun device, a bar code reader device, a ten key device, radio frequency ("RF") scanners, handheld units, pocket PCs, data collection terminals, portable units, and other data entry devices. Advantageously, the GUIXT client 120 is adapted for use on the various particular types of machines on which it may be implemented and is configured to make efficient use of the various aspects of such devices, e.g., the laser, bar code reader, etc.

The offline interface module 270 interacts with a user to present offline transaction forms that can be used to input transaction data. The offline interface module 270 also allows the user to manipulate offline data, for example by performing subsequent offline transactions related to or directly involving previously collected offline data. The offline interface module 270 also interacts with the GUIXT server to send the transaction data to the SAP R3 server.

In one embodiment, the GUIXT client 120 provides client functionality that operates without the need for direct interaction with the SAP R3 server (backend) application to which it will ultimately provide its transaction data. For example, the offline interface module 270 may download a set of records that collectively comprise a transaction, such as an invoice. These records can be stored in the data storage area 125. In practice, an offline GUIXT client 120 allows a field agent to interact with the transaction records via the offline interface module 270 to capture necessary transaction data in real time. Up to date transaction records are downloaded onto the offline GUIXT client 120 device and stored in data storage area 125 prior to carrying out the transaction. Records for any type of transaction can be created. The offline user can perform multiple transactions while offline using the transaction records. The results of these multiple transactions are stored in the data storage area 125. Subsequent transactions can even use stored data that was collected during a prior offline transaction and stored in the data storage area 125 on the offline GUIXT client 120. When the user returns to a place where the offline GUIXT client 120 device goes online, the offline interface module 270 synchronizes the transaction data with the SAP R3 server via the GUIXT server.

In one embodiment, the transaction records that are provided to the GUIXT client 120 can be created (e.g., by the GUIXT sever) using a shadow transaction. For example, when a GUIXT client 120 is connected to the SAP R3 server, the GUIXT server records a transaction. The GUIXT server begins recording and stores the various data fields required for the transaction and stops the recording when the transaction is done. Advantageously, the GUIXT server offline module 200 converts the entire recorded sequence into the set of transaction records needed to fully carry out that transaction while offline. Advantageously, the set of transaction records may be condensed before being provided to the GUIXT client 120 to improve efficiency of data collection during the offline transaction.

In an alternative embodiment, transaction records can have expiration tags added to each record or each field in each record such that all or certain data in the offline transaction records is associated with an expiration tag. Thus, while the GUIXT client 120 is still offline, the transaction data collected via the offline interface module 270 can be retrieved from data storage 125 and processed to determine what data, if any, may be expired or near expiration. For example, collected transaction data can be tagged (e.g., using color in a visual interface) according to the margin of error possible based on the validity (expired or not) of the collected transaction data.

For example, a base unit price for a widget has an expiration date in the transaction records that were downloaded from the SAP R3 server and stored in data storage area 125 on the GUIXT client 120. The discount logic for widget sales also has an expiration date. In this example, because the offline GUIXT client 120 device has not recently synchronized with the SAP R3 server, the discount logic for widget sales has expired, although the base unit price has not expired. Finally, a transaction was just entered and the transaction itself is still valid (i.e., not expired).

Given this scenario, the offline interface module 270 is configured to process the data for this particular widget sales transaction and, for example, color the base price green because the number of widgets from the transaction multiplied by the base unit price is still valid, unexpired information. However, the discount amount (which is calculated) is colored red because the discount logic has expired. Other scenarios for entering transaction data and calculating potential results can also be implemented to allow, e.g., a sales person to walk through a variety of scenarios with a customer or potential customer. In this fashion, e.g., a sales person can still work and apply factors when presenting the information in the field while being notified with easily recognizable correction factors and prompted to provide appropriate disclaimers, for example.

Advantageously, when the GUIXT client 120 device is later online and synchronized with the SAP R3 server, the expired information from the offline transaction records stored on the GUIXT client 120 device is updated and provided to the SAP R3 server so that the correct parameters of the transaction are entered into the system.

In one embodiment, the offline interface module 270 is configured to implement certain smart attributes, for example during data collection on a mobile GUIXT client 120 device with limited user interface capabilities. In one embodiment, smart attributes can include: (1) pattern matching; (2) validation; (3) auto-tab; and (4) auto-submit. Pattern matching allows certain entry fields of a transaction requiring data input to be associated with a predetermined pattern. When a user enters data conforming to the predetermined pattern, the offline interface module 270 populates that field with the conforming data. Advantageously, the field is populated whether the field is currently the active data entry field or if the field appears somewhere else in the form. For example, a transaction form has three fields with the following predetermined pattern matching characteristics:
  field__1: ???
  field__2: bin*
  field__3: am2-?00
  During data entry for a transaction, if the user enters:
  am2-400,<TAB>,100,<TAB>,bin34789897 then the offline interface module 270 populates field__1 with 100, populates field__2 with bin34789897, and populates field__3 with am2-400. In this example, the <TAB> key indicates that the user is done entering data for a field. Advantageously, transaction forms can have a plurality of fields with predetermined pattern matching characteristics assigned and other fields without assigned predetermined pattern matching characteristics. The pattern matching capabilities of the offline interface module 270 only attempt to populate those with having assigned predetermined pattern matching characteristics with entered data that matches.

The validation capabilities of the offline interface module 270 allow data entered into a particular field (whether by pattern matching or not) to be validated against predetermined characteristics of valid input for the field. For example, a field may be valid only if numerical data is entered, or only if 10 numerical digits are entered (e.g., a phone number field). Various combinations can be employed as the predetermined characteristics of valid input for a field. Advantageously, this allows data to be validated at the time of entry such that it does not have to be re-entered upon validation (if any) by the SAP R3 server.

The auto-tab capabilities of the offline interface module 270 allow data to be entered without having to enter the <TAB> character between field. Auto-tab can be employed during field data input into a form, but may most advantageously be employed during barcode scanner or other types of automated input from a GUIXT client device 120. For example, the offline interface module 270 may determine whether a user is manually entering data or if the data is being provided by a barcode reader or scanner by determining the elapsed time between the first character of data input and the second character of data input. If the elapsed time exceeds a certain predetermined threshold, then the offline interface module 270 determines that the data entry is manual. In one embodiment, a threshold of 40 milliseconds can be used such that if the time between the first and second characters is less than 40 milliseconds, then the offline interface module 270 determines that the data input means is by some automated device such as a barcode reader, scanner, or other such device. Advantageously, if the entry means is determined to be other than manual data entry, the offline interface module 270 implements the auto tab more quickly than if the data is being entered manually by the user.

In one embodiment, the auto-tab function is implemented after a certain period of elapsed time with no data input. For example, during field data input, a user may type in a certain amount of data and then pause for a few seconds. When a predetermined threshold of time has passed, the offline interface module 270 automatically proceeds to the next data entry field, or automatically determines that the next entered data is for a separate field (e.g., when pattern matching is also being employed). The predetermined threshold of time is advantageously reset whenever data is entered prior to the passing of the predetermined threshold amount of time. In an alternative embodiment, a plurality of predetermined time thresholds can be established with different actions associated with each. For example, a short pause may cause an auto-tab to the next field while a long pause may indicate that the user is done entering text, but no auto-tab is employed. Additionally, offline interface module 270 may distinguish between different types of input such that if the input is made via a scanning device, then the auto-tab is performed after each scan, regardless of any predetermined threshold of time value that has been set.

The auto-submit capabilities of the offline interface module 270 allow data to be automatically submitted (e.g., either offline to data storage or online to the SAP R3 server) when all expected data has been entered. This feature may be employed during manual data entry and may also be advantageously employed during automated data entry using a GUIXT client 120 device such as a barcode reader, scan gun or other such device. In one embodiment, an auto-submit will be performed only after pattern matching and validation have been performed.

The mobile interface module 280 interacts with the mobile module 250 on the GUIXT server to maintain the session between the GUIXT client 120 and the SAP R3 server on a mobile device that may have a network connection that is spotty or intermittent.

The server communication module 290 is configured to facilitate communications between the GUIXT client 120 and the GUIXT server 110. The server communication module 290 may work in conjunction with the mobile and offline interfaces to facilitate communications with the GUIXT server 110. For example, the server communication module allows a user to configure a connection to a SAP R3 server by providing the name of the application server module or providing a SAP router string (e.g., an IP address of a GUIXT server). User validation information such as a user name and password can also be stored in a user profile by the server communication module 290 to facilitate rapid connections with automatic login when desired. The user profile may also designate which smart attributes are to be used and allow the user to set the predetermined time thresholds for data entry means detection, auto-tab and/or auto-submit. Other access control and user restrictions and permissions may also be stored into the user profile.

Advantageously, the server communication module 290 is also configured to allow the GUIXT client 120 device to maintain multiple sessions at the same time with the GUIXT server/SAP R3 server.

The termination node module 225 monitors traffic between the GUIXT client 120 device and the SAP R3 server and timely responds to SAP R3 Remote Function Call ("RFC") communications that require a response in order to satisfy the SAP R3 communication protocol. The responses to SAP R3 requests from the termination node module 225 preserve the session between the SAP R3 server and the GUIXT client 120 device whether or not the user of the GUIXT client 120 is currently active and communicating with the GUIXT server 110. The responsive communications from the termination node module 225 to the SAP R3 server advantageously do not adversely affect the fidelity of the underlying data in a current (or perhaps suspended) transaction between the GUIXT client 120 and the SAP R3 server. Advantageously, preservation of the session by the termination node module 225 allows the GUIXT client 120 device to access and obtain the full range of available data and transactions from the SAP R3 server, which would otherwise be limited or altogether unavailable. In one embodiment, the termination node module 225 receives communications from the SAP R3 server and translates those communications into another form such as hypertext markup language ("HTML") or java script object notation ("JSON"). Other formats may also be used. Advantageously, the translated HTML or JSON communications are more easily processed and handled by the GUIXT client 120.

Figure 5:
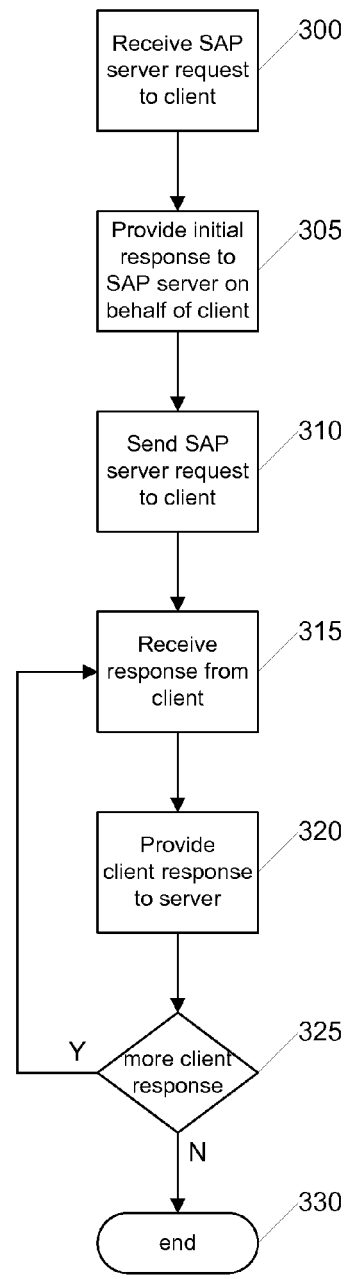
FIG. 5 is a flow diagram illustrating an example method for mobile communications in a SAP environment according to an embodiment of the present invention.

FIG. 5 is a flow diagram illustrating an example method for mobile communications in a SAP environment according to an embodiment of the present invention. The process can be carried out by a system such as previously described with respect to FIGS. 2-4, for example, by the GUIXT server module or the GUIXT server device in combination with a GUIXT client or SAP GUI client. Initially, in step 300 the GUIXT server receives a SAP server request destined for a GUIXT client. The GUIXT server determines that the request requires a response and therefore in step 305 the termination node module sends a responsive communication to the SAP server on behalf of the GUIXT client. Advantageously, the responsive communication allows the session between the SAP server and the GUIXT client to be maintained. In step 310, the GUIXT server also sends the SAP server request to the GUIXT client for processing. Once a response is received from the GUIXT client, as shown in step 315, the GUIXT server provides the client response to the SAP server in step 320. If there are more client responses received, as determined in step 325, those additional responses are also provided to the SAP server upon receipt. Alternatively, if there is more data to be sent to the SAP server as part of a single response, the GUIXT server sends that data to the SAP server. Once the complete response from the client has been sent to the SAP server, the process ends. The process may begin again when a new SAP server request is sent to the GUIXT client.

Figures 6, 7:
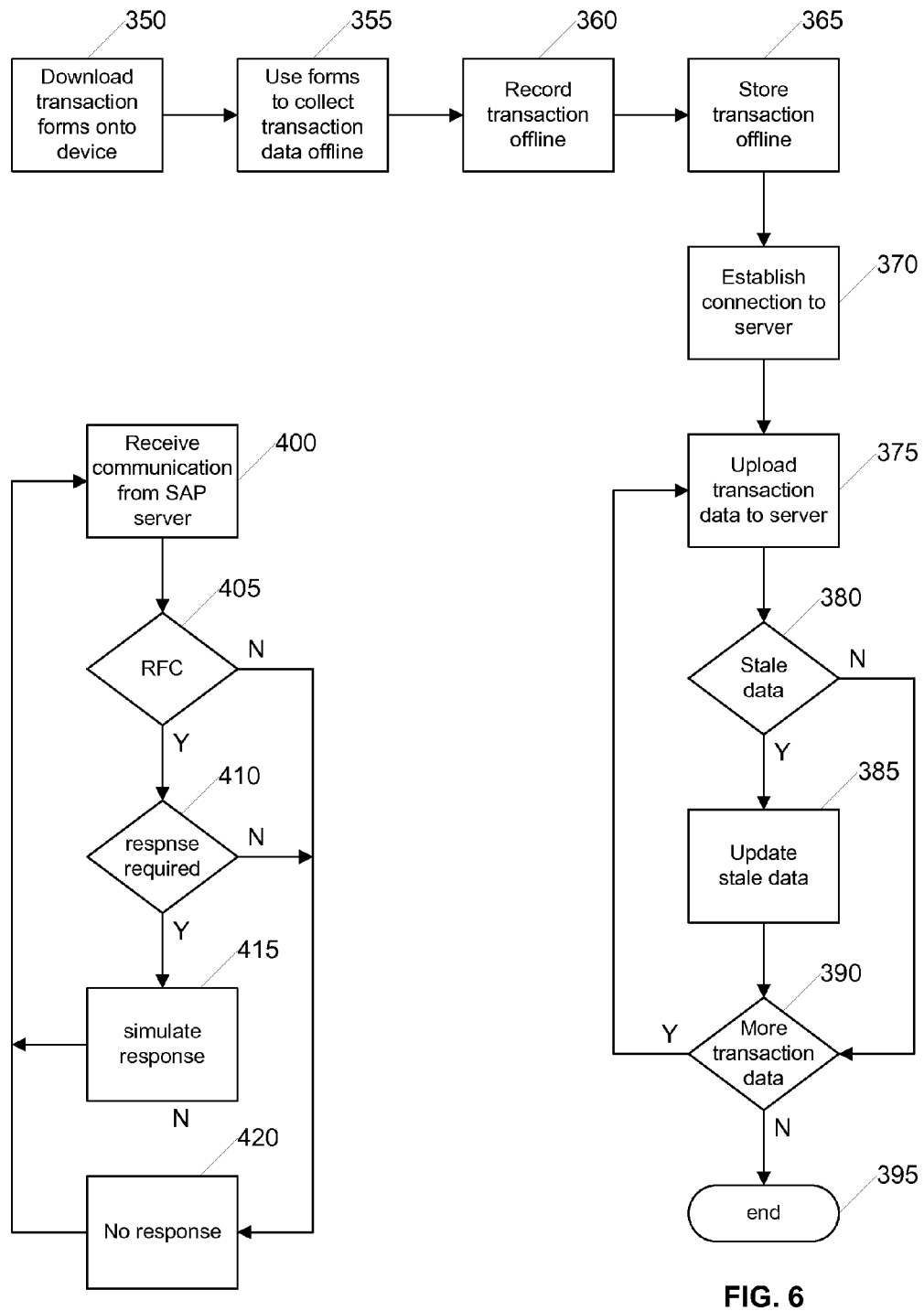
FIG. 6 is a flow diagram illustrating an example method for offline data collection and synchronization in a SAP environment according to an embodiment of the present invention.
FIG. 7 is a flow diagram illustrating an example method for maintaining a persistent connection with a SAP server in a SAP environment according to an embodiment of the present invention.

FIG. 6 is a flow diagram illustrating an example method for offline data collection and synchronization in a SAP environment according to an embodiment of the present invention. The process can be carried out by a system such as previously described with respect to FIGS. 2-4, for example, by the GUIXT server module or the GUIXT server device in combination with a GUIXT client or SAP GUI client. Initially, in step 350 transaction forms are downloaded onto the GUIXT client device. The offline transaction forms may be initially stored by the GUIXT server during an online transaction process with the SAP server such that the required data entry fields and related transaction information (e.g., expiration information) is current. The stored transaction forms (e.g., screens) may then be processed at the GUIXT server to increase efficiency, for example by condensing screens/forms and otherwise improving the flow for necessary data that is part of the transaction. The transaction forms are then provided to the GUIXT client and stored in memory on the GUIXT client for use in the field to collect transaction data while offline, as shown in step 355.

During an offline transaction, in step 360 the transaction data is recorded and stored locally in the offline GUIXT client device in step 365. During the offline transaction, pattern matching, validation, auto-tab and auto-submit smart attributes can be employed. Advantageously, the stored transaction data can be processed offline for a variety of uses including subsequent transactions or to see calculations and the effect of expired data. At some later time, the GUIXT client device is brought online and a connection is established with a GUIXT server and a session is created with a SAP server as shown in step 370. The transaction data is uploaded to the SAP server in step 375 through the GUIXT server, which can reformat and convert the transaction data from the GUIXT client device as needed for delivery to the SAP server in a format recognized by the SAP server. For example, the condensed offline transaction data may be populated back into the plurality of screens that are expected by the SAP server for that particular transaction. If any portion of the data to be provided to the SAP server is expired, as determined by examination of expiration tags associated with the data in step 380, the GUIXT server can update the expired data in step 385 before sending it to the SAP server in step 375. Data from multiple transactions can be provided to the SAP server using this process.

FIG. 7 is a flow diagram illustrating an example method for maintaining a persistent connection with a SAP server in a SAP environment according to an embodiment of the present invention. The process can be carried out by a system such as previously described with respect to FIGS. 2-4, for example, by the GUIXT server module or the GUIXT server device in combination with a GUIXT client or SAP GUI client. Alternatively, the process could be carried out by only a GUIXT client. Initially, in step 400 the GUIXT server receives a SAP server request destined for a GUIXT client. The GUIXT server analyzes the SAP request in step 405 to determine if the request is a particular type of request called a remote function call. If the SAP server request is not an RFC request then the GUIXT server forwards the request to GUIXT client and makes no response to the SAP server, as shown in step 420.

However, if the request is an RFC request, as determined in step 405, then the GUIXT server determines if the RFC request is the type of RFC request that requires a response to maintain the session between the GUIXT client and the SAP server, as shown in step 410. If the request does not require a response to maintain the session or for any other reason, then the GUIXT server makes no response to the SAP server, as shown in step 420. If the RFC request does require a response, however, then in step 415 the GUIXT server (e.g., using the previously described termination node module) generates a simulated response with sufficient information to maintain the session between the GUIXT client and the SAP server and sends the simulated response to the SAP server on behalf of the GUIXT client for which the RFC request was originally destined. Advantageously, by simulating the required RFC response, the GUIXT server is able to maintain the session between the SAP server and the GUIXT client.

Figure 8:
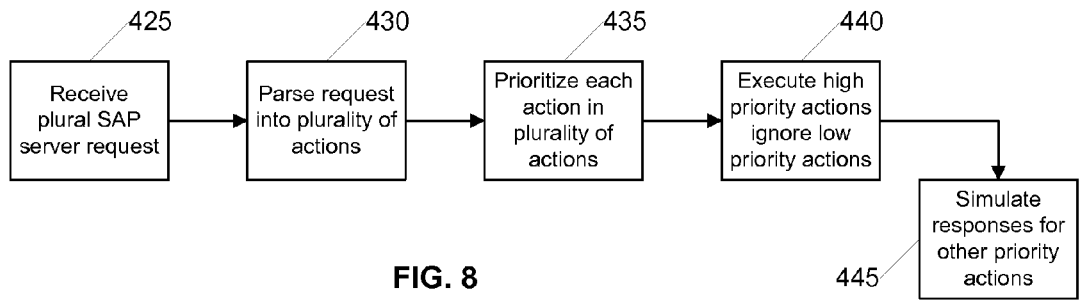
FIG. 8 is a flow diagram illustrating an example method for improved SAP communications according to an embodiment of the present invention.

FIG. 8 is a flow diagram illustrating an example method for improved SAP communications according to an embodiment of the present invention. The process can be carried out by a system such as previously described with respect to FIGS. 2-4, for example, by the GUIXT server module or the GUIXT server device in combination with a GUIXT client or SAP GUI client. Alternatively, the process could be carried out by only a GUIXT client. Initially, in step 425 the GUIXT server or client receives a plural SAP server request. A plural SAP server request is a request that can be parsed out into more than one separate action. One example of a plural SAP server request is an OLE_FLUSH_CALL request. Next, in step 430 the plural SAP server request is parsed into a plurality of discrete actions to be handled by the GUIXT client. Next, in step 435, each of the discrete actions is assigned a relative priority by the GUIXT server or client and in step 440 the high priority actions are carried out and responses are sent to the SAP server. For example, the high priority items can be forwarded to or processed by the GUIXT client in order to generate responses to these particular items.

Additionally, in step 440 the low priority actions that do not require a response are ignored and the GUIXT server or client sends no response to the SAP server. For each of the other actions that need to be responded to in order to maintain effective communications with the SAP server (e.g., to maintain the session) but are not necessarily required in the context of the current workflow, in step 445 the GUIXT server (e.g., the previously described termination node module) generates a simulated response to the SAP server and sends the simulated responses to the SAP server. Accordingly, the GUIXT server or client selectively responds to the actions that require a response and ignores those actions that do not require a response to maintain the session with the SAP server without loss of data fidelity.

For example, a particular action may require an associated handle to an object. In one embodiment, a handle is a numerical identifier. Accordingly, the handle is fabricated by the GUIXT server (e.g., by the previously described termination node module) and then sent back to the SAP server to simulate a response to that particular action, effectively completing the communication loop with the SAP server. In one embodiment, the handle may be fabricated by generating a random number for use as the handle or by using a timestamp or some other technique, as will be understood by those skilled in the art. Advantageously, the system improves SAP communications by sending the simulated responses to the SAP server that indicate that an action has been carried out prior to the action actually being carried out. The GUIXT server then manages the actual carrying out of the action in a manner that is most efficient for the GUIXT server and GUIXT client while the SAP server can also move along with its own most efficient SAP communications processing.

Additionally, the system improves SAP communications by dividing a SAP server request into a plurality of separate actions and then prioritizing each of the individual actions. In this fashion, the GUIXT server can attend to the highest priority actions and provide timely responses to the SAP server and the GUIXT sever can ignore the lowest priority actions to which the SAP server does not require a response. A significant advantage in improved SAP communications is also realized by having the GUIXT server (e.g., the previously described termination node module) simulate responses to the SAP server for those actions that require a response to the SAP server but are not required in the context of the current workflow to be immediately attended to. Thus, the GUIXT server (e.g., the previously described termination node module) responds to the SAP server prior to the completion of the task and in many cases prior to the task even beginning to be carried out by the GUIXT client or GUIXT server, whichever has been assigned the particular task.

Figure 9:
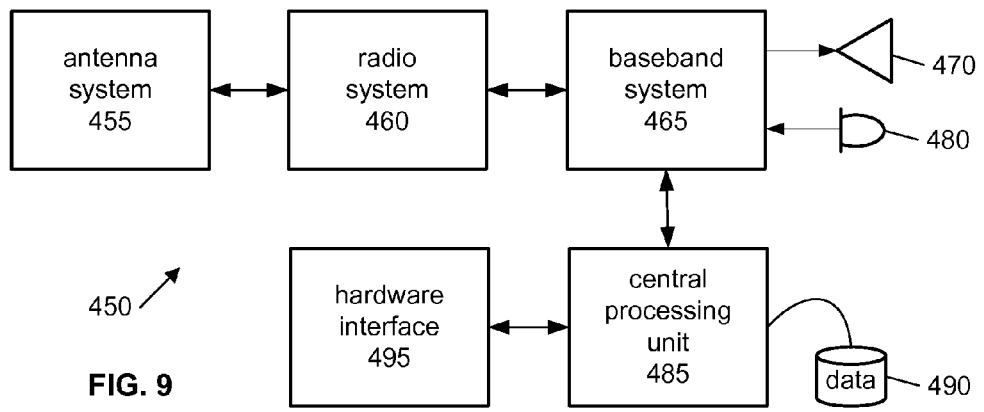
FIG. 9 is a block diagram illustrating an example wireless communication device that may be used in connection with various embodiments described herein.

FIG. 9 is a block diagram illustrating an example wireless communication device 450 that may be used in connection with various embodiments described herein. For example, the wireless communication device 450 may be used in conjunction with a GUIXT client or server as previously described with respect to FIGS. 2-4. Other wireless communication devices and/or architectures may also be used, as will be clear to those skilled in the art.

In the illustrated embodiment, wireless communication device 450 comprises an antenna system 455, a radio system 460, a baseband system 465, a speaker 470, a microphone 480, a central processing unit ("CPU") 485, a data storage area 490, and a hardware interface 495. In the wireless communication device 450, radio frequency ("RF") signals are transmitted and received over the air by the antenna system 455 under the management of the radio system 460 to provide a network communication interface that provides connectivity to a wireless communication network that can transmit voice or data communications.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communicate over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIGS. 3-4 and are executable by processor 485.

In this description, the term "computer readable medium" is used to refer to any media used to provide executable instructions (e.g., software and computer programs) to the wireless communication device 450 for execution by the central processing unit 485. Examples of these media include the data storage area 490, microphone 480 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth, infrared, laser, or RF wireless unit, or any of a variety of wired or wireless access mechanisms. Examples of hardware that may be linked with the device 450 include barcode readers, laser scanners, data storage devices, computing devices, headphones, microphones, and the like.

Hardware interface 495 may also be linked with device specific input mechanisms such as a laser gun, barcode reader, or RF reader. In one embodiment, the hardware interface 495 connects a barcode reader for use in a warehouse. In an alternative embodiment, the hardware interface 495 connects a scanning device for use in reading barcodes, meters, or other data producing indicia.

Figure 10:
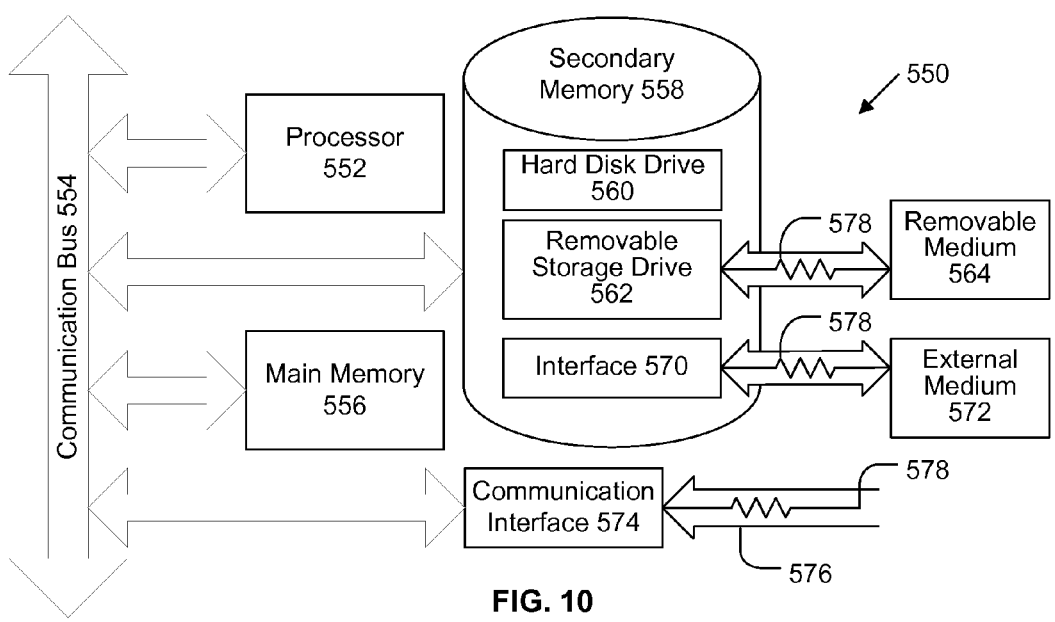
FIG. 10 is a block diagram illustrating an example computer system that may be used in connection with various embodiments described herein.

FIG. 10 is a block diagram illustrating an example computer system 550 that may be used in connection with various embodiments described herein. For example, the computer system 550 may be used in conjunction with GUIXT server, a SAP R3 server (that implements the GUIXT server), or a GUIXT client as previously described with respect to FIGS. 2-4. Other computer systems and/or architectures may also be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, PCI Express ("PCI-E"), Accelerated Graphics Port ("AGP") or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), double data rate synchronous dynamic random access memory ("DDR", "DDR-2", "DDR-3"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550. In one embodiment, main memory 556 and secondary memory 558 may include various software modules (not shown) that were previously described with respect to FIGS. 3-4 and are executable by processor 552.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, an RF interface, and an IEEE 1394 fire-wire, just to name a few. Examples of hardware that may be linked with the device 550 via the communication interface 574 include barcode readers, laser scanners, data storage devices, computing devices, headphones, microphones, and the like.

Communication interface 574 may also be linked with device specific input mechanisms such as a laser gun, barcode reader, RF reader, or keyboard and/or pointer device designed to collect user input. In one embodiment, the communication interface 574 connects a barcode reader for use in a warehouse. In an alternative embodiment, the communication interface 574 connects a scanning device for use in reading barcodes, meters, or other data producing indicia. In yet another alternative embodiment, the communication interface 574 connects a data collection terminal in a warehouse.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), Point-to-Point Protocol over Ethernet ("PPPoE") and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs or modules, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A system for improved communication with an enterprise resource planning (ERP) application, the system comprising:
at least one computer-readable storage device;
at least one processor communicatively coupled with the at least one computer-readable storage device; and
at least one executable program module stored on the at least one computer-readable storage device, wherein the at least one executable program module, when executed by the at least one processor,
condenses a number of user interfaces required to complete a transaction by a server application on an ERP server from a larger set of user interfaces into a smaller set of user interfaces;
provides the smaller set of user interfaces to a client application;
receives data from the client application via the smaller set of user interfaces; and
provides the data to the server application using the larger set of user interfaces.

2. The system of claim 1, wherein the at least one executable program module further:
provides at least one transaction to the client application for completion;
receives completed transaction information from the client application; and
sends the completed transaction information to the ERP server.

3. The system of claim 2, wherein the at least one executable program module provides the at least one transaction to the client application at a first time period when the client application is communicatively connected to the at least one executable program module, and receives the completed transaction information from the client application at a third time period, which is after the first time period and after a second time period during which the client application is not communicatively connected to the at least one executable program module.

4. The system of claim 3, wherein sending the completed transaction information to the ERP server comprises sending the completed transaction information to the ERP server as if the at least one transaction was being processed in real time.

5. The system of claim 1, wherein the at least one executable program module further:
receives one or more requests from the ERP server, the one or more requests comprising a plurality of actions to be handled by the client application, wherein the plurality of actions comprise a first subset of one or more actions which require a response and a second subset of one or more actions which do not require a response,
sends a response to the ERP server for each of the first subset of one or more actions which require a response, and
ignores each of the second subset of one or more actions which do not require a response.

6. The system of claim 1, wherein the client application is a SAP graphical user interface (GUI) client, the ERP server is a SAP server, and the at least one executable program module provides a communication link between the SAP GUI client and the SAP server.

7. The system of claim 6, wherein the at least one executable program module translates one or more communications from the SAP server to a different form before providing the one or more communications to the SAP GUI client.

8. The system of claim 7, wherein the different form is one of Hypertext Markup Language (HTML) and JavaScript Object Notation (JSON).

9. The system of claim 1, wherein the at least one executable program module further:
detects a disconnection with the client application, while the client application has a session with the ERP server;
suspends the session with the ERP server;
detects a reconnection with the client application; and
reactivates the suspended session with the ERP server.

10. The system of claim 1, wherein the ERP server is an SAP server.

11. The system of claim 1, wherein the ERP server is stored on the at least one computer-readable storage device.

12. The system of claim 1, wherein the client application provides one or more of:
matching data that is input into a field of a user interface to a predetermined pattern to populate the field with conforming data;
validating data that is input into a field of a user interface against predetermined characteristics;
automatically proceeding to a second field of a user interface after a predetermined period of time has elapsed since entry of data into a first field of the user interface; and
automatically sending data that is input into one or more fields of a user interface after all expected data has been input.

13. The system of claim 1, wherein the client application is stored on the at least one computer-readable storage device and when executed by the at least one processor receives first data that is input into a first field of a first user interface in the smaller set of user interfaces, conforms said first data to a predetermined pattern, and presents said conforming data in said field.

14. The system of claim 1, wherein the client application is stored on the at least one computer-readable storage device and when executed by the at least one processor receives second data input into a second field of a second user interface in the smaller set of user interfaces and validates said second data against predetermined characteristics.

15. The system of claim 1, wherein the client application is stored on the at least one computer-readable storage device and when executed by the at least one processor automatically proceeds from a first field of a first user interface in the smaller set of user interfaces to a second field of the first user interface when a predetermined period of time has elapsed since entry of data into said first field of the first user interface.

16. The system of claim 1, wherein the client application is stored on the at least one computer-readable storage device and when executed by the at least one processor automatically provides to the at least one executable program module, data that is input into one or more fields of a first user interface in the smaller set of user interfaces after all expected data for said first user interface has been received.

17. The system of claim 1, wherein the client application resides on one of a personal computer device and a personal data assistant.

18. The system of claim 1, wherein the client application resides on one of a laser scanner gun device, bar code reader device, ten key device and radio frequency scanner.

19. The system of claim 1, wherein the client application resides on a pocket PC.

20. The system of claim 1, wherein the client application resides on one of a data collection terminal, a handheld unit and a portable unit.

21. The system of claim 1, wherein the client application resides on a smart phone device.

22. The system of claim 1, wherein the plurality of actions comprise a remote function call (RFC).

23. The system of claim 1, wherein the plurality of actions comprise an object linking and embedding (OLE) call.

24. The system of claim 1, further comprising a second executable program module stored on the at least one computer-readable storage device, wherein said second executable program module condenses the user interfaces in the smaller set of user interfaces.

25. The system of claim 24, wherein the second executable program module is a script.

26. The system of claim 1, wherein each user interface in the larger set of user interfaces is a screen on the ERP server.

27. A method for improved communication with an enterprise resource planning (ERP) application, the method comprising, by at least one processor which executes at least one executable program module:
condensing a number of user interfaces required to complete a transaction by a server application on an ERP server from a larger set of user interfaces into a smaller set of user interfaces;
providing the smaller set of user interfaces to a client application;
receiving data from the client application via the smaller set of user interfaces; and
providing the data to the server application using the larger set of user interfaces.

28. The method of claim 27, further comprising:
at a first time period when the client application is communicatively connected to the at least one executable program module, providing at least one transaction to the client application for completion;
at a second time period, detecting a disconnection with the client application;
at a third time period which is after the first time period and the second period, receiving completed transaction information from the client application; and
sending the completed transaction information to the ERP server.

29. The method of claim 28, wherein sending the completed transaction information to the ERP server comprises sending the completed transaction information to the ERP server as if the at least one transaction was being processed in real time.

30. The method of claim 27, further comprising:
receiving one or more requests from the ERP server, the one or more requests comprising a plurality of actions to be handled by the client application, wherein the plurality of actions comprise a first subset of one or more actions which require a response and a second subset of one or more actions which do not require a response;
sending a response to the ERP server for each of the first subset of one or more actions which require a response; and
ignoring each of the second subset of one or more actions which do not require a response.

31. The method of claim 27, further comprising:
detecting a disconnection with the client application, while the client application has a session with the ERP server;
suspending the session with the ERP server;
detecting a reconnection with the client application; and
reactivating the suspended session with the ERP server.

32. The method of claim 27, wherein the ERP server is an SAP server.

33. The method of claim 27, further comprising one or more of:
matching data that is input into a field of a user interface to a predetermined pattern to populate the field with conforming data;
validating data that is input into a field of a user interface against predetermined characteristics;
automatically proceeding to a second field of a user interface after a predetermined period of time has elapsed since entry of data into a first field of the user interface; and
automatically sending data that is input into one or more fields of a user interface after all expected data has been input.

34. The method of claim 27, wherein the client application is stored on the at least one computer-readable storage device and when executed by the at least one processor receives first data that is input into a first field of a first user interface in the smaller set of user interfaces, conforms said first data to a predetermined pattern, and presents said conforming data in said field.

35. The method of claim 27, wherein the client application is stored on the at least one computer-readable storage device and when executed by the at least one processor receives second data input into a second field of a second user interface in the smaller set of user interfaces and validates said second data against predetermined characteristics.

36. The method of claim 27, wherein the client application is stored on the at least one computer-readable storage device and when executed by the at least one processor automatically proceeds from a first field of a first user interface in the smaller set of user interfaces to a second field of the first user interface when a predetermined period of time has elapsed since entry of data into said first field of the first user interface.

37. The method of claim 27, wherein the client application is stored on the at least one computer-readable storage device and when executed by the at least one processor automatically provides to the at least one executable program module, data that is input into one or more fields of a first user interface in the smaller set of user interfaces after all expected data for said first user interface has been received.

38. The method of claim 27, wherein the client application resides on one of a personal computer device and a personal data assistant.

39. The method of claim 27, wherein the client application resides on one of a laser scanner gun device, bar code reader device, ten key device and radio frequency scanner.

40. The method of claim 27, wherein the client application resides on a pocket PC.

41. The method of claim 27, wherein the client application resides on one of a data collection terminal, a handheld unit and a portable unit.

42. The method of claim 27, wherein the client application resides on a smart phone device.

43. The method of claim 27, wherein the plurality of actions comprise a remote function call (RFC).

44. The method of claim 27, wherein the plurality of actions comprise an object linking and embedding (OLE) call.

45. The method of claim 27, further comprising a second executable program module stored on the at least one computer-readable storage device, wherein said second executable program module condenses the user interfaces in the smaller set of user interfaces.

46. The method of claim 45, wherein the second executable program module is a script.

47. The method of claim 27, wherein each user interface in the larger set of user interfaces is a screen on the ERP server.

48. An apparatus for improved communication with an enterprise resource planning (ERP) application, the system comprising:
- at least one computer-readable storage device;
- at least one processor communicatively coupled with the at least one computer-readable storage device; and
- at least one executable program module stored on the at least one computer-readable storage device, wherein the at least one executable program module, when executed by the at least one processor,
  - receives one or more requests from an ERP server, the one or more requests comprising a plurality of actions to be handled by a client application,
  - wherein the plurality of actions comprise a first subset of one or more actions which require a response and a second subset of one or more actions which do not require a response,
  - sends a response to the ERP server within a predetermined time period for each of the first subset of one or more actions which require a response, and
  - ignores during the predetermined time period each of the second subset of one or more actions which do not require a response;
  - condenses a number of user interfaces required to complete a transaction on the ERP server from a larger set of user interfaces into a smaller set of user interfaces;
  - provides the smaller set of user interfaces to the client application;
  - receives data from the client application via the smaller set of user interfaces; and
  - provides the data to the server application using the larger set of user interfaces.

49. The apparatus of claim 48, wherein the client application is stored on the at least one computer-readable storage device and when executed by the at least one processor receives first data that is input into a first field of a first user interface in the smaller set of user interfaces, conforms said first data to a predetermined pattern, and presents said conforming data in said field.

50. The apparatus of claim 48, wherein the client application is stored on the at least one computer-readable storage device and when executed by the at least one processor receives second data input into a second field of a second user interface in the smaller set of user interfaces and validates said second data against predetermined characteristics.

51. The apparatus of claim 48, wherein the client application is stored on the at least one computer-readable storage device and when executed by the at least one processor automatically proceeds from a first field of a first user interface in the smaller set of user interfaces to a second field of the first user interface when a predetermined period of time has elapsed since entry of data into said first field of the first user interface.

52. The apparatus of claim 48, wherein the client application is stored on the at least one computer-readable storage device and when executed by the at least one processor automatically provides to the at least one executable program module, data that is input into one or more fields of a first user interface in the smaller set of user interfaces after all expected data for said first user interface has been received.

53. The apparatus of claim 48, wherein the apparatus is one of a personal computer device and a personal data assistant.

54. The apparatus of claim 48, wherein the apparatus is one of a laser scanner gun device, bar code reader device, ten key device and radio frequency scanner.

55. The apparatus of claim 48, wherein the apparatus is a pocket PC.

56. The apparatus of claim 48, wherein the apparatus is one of a data collection terminal, a handheld unit and a portable unit.

57. The apparatus of claim 48, wherein the apparatus is a smart phone device.

58. The apparatus of claim 48, wherein the plurality of actions comprise a remote function call (RFC).

59. The apparatus of claim 48, wherein the plurality of actions comprise an object linking and embedding (OLE) call.

60. The apparatus of claim 48, further comprising a second executable program module stored on the at least one computer-readable storage device, wherein said second executable program module condenses the user interfaces in the smaller set of user interfaces.

61. The apparatus of claim 60, wherein the second executable program module is a script.

62. The apparatus of claim 48, wherein each user interface in the larger set of user interfaces is a screen on the ERP server.

* * * * *